July 5, 1927.

W. H. DRATH 1,634,255

METHOD AND APPARATUS FOR HANDLING CEMENT AND BULK MATERIAL

Filed Oct. 20, 1923    2 Sheets-Sheet 1

INVENTOR
Wilfred H. Drath
By Byrnes, Stebbins & Parmelee
His Attys

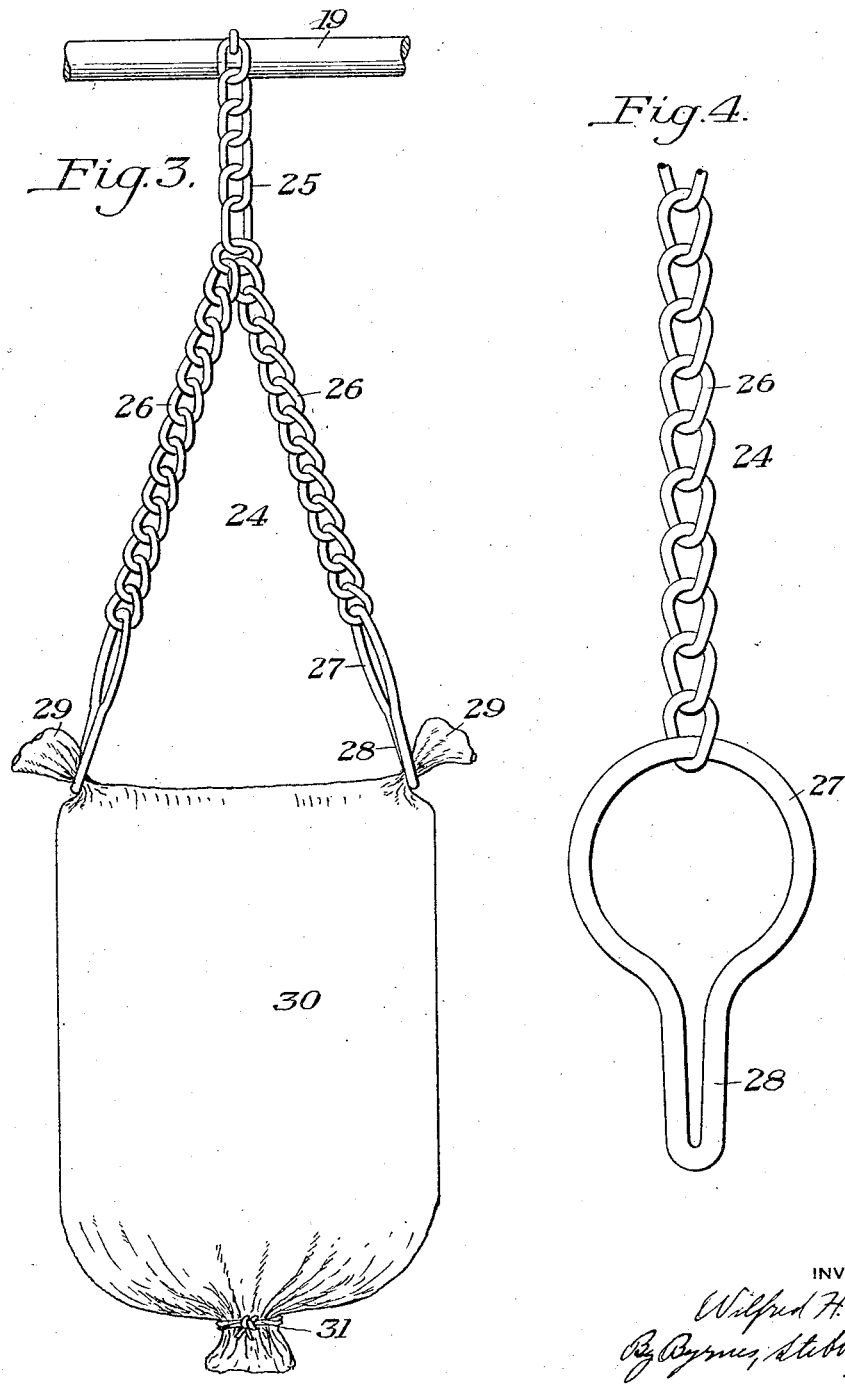

Patented July 5, 1927.

1,634,255

UNITED STATES PATENT OFFICE.

WILFRED H. DRATH, OF BUTLER, PENNSYLVANIA.

METHOD AND APPARATUS FOR HANDLING CEMENT AND BULK MATERIAL.

Application filed October 20, 1923. Serial No. 669,867.

The present invention relates to a method and an apparatus for handling cement and bulk material, and more particularly for handling the materials used in constructing concrete roads and streets.

It is customary in constructing concrete roads and streets to put the sand, gravel and cement constituting a batch in a cement mixer which thoroughly mixes these materials with each other and with a certain quantity of water. The sand and gravel are usually transported in bulk to the mixer by means of a truck having a body adapted to be tilted about a transverse axis by raising the forward end of said body. The body is ordinarily divided into a number of compartments by means of a tail-gate and intermediate transverse partitions, which are adapted to pivot about their upper edges. Enough sand and gravel for a batch is put into each compartment and when the truck arrives at the mixer, it is backed up in position so that its rear end overlies the charging pan of the mixer. The front end of the body is then raised and the tail-gate released, which permits the sand and gravel in the rear compartment of the body to fall into the charging pan. The cement is transported in bags and a number of these bags of cement is placed at convenient points along the roadway or street. When the sand or gravel has been dumped into the charging pan, as described, workmen carry a sufficient number of bags of cement for a batch from the side of the road or street and cut them open and dump their contents on top of the sand and gravel in the charging pan. The truck is then moved forward so as to clear the charging pan and the latter is elevated to discharge the batch contained therein into the hopper of the mixer. This operation is repeated for the material contained in each of the compartments of the truck body. The above method of handling cement and bulk material involves a considerable amount of labor, because at least two workmen are required to handle the bags of cement and another workman to handle the truck, and furthermore, the workmen handling the cement are exposed to clouds of cement dust in dumping the bags of cement into the charging pan of the mixer.

By the present invention I have provided a method for handling these materials which is more efficient than the method heretofore employed, requires a fewer number of workmen than heretofore and exposes these workmen in a lesser degree to the objectionable clouds of cement dust. I have also provided an improved apparatus for carrying out the method and a special form of chain particularly adapted for use in carrying out the method.

In the accompanying drawings, there is shown, for purposes of illustration only, one embodiment of my invention, it being understood that the drawings do not define the limits of the invention, as changes may be made in the construction and operation therein disclosed without departing from the spirit of the invention or scope of my broader claims.

In the drawings:

Figure 3 is a detail view illustrating the manner of holding a bag by means of my improved chain; and Figure 4 is a fragmentary detail view illustrating a portion of the chain.

Figure 1:
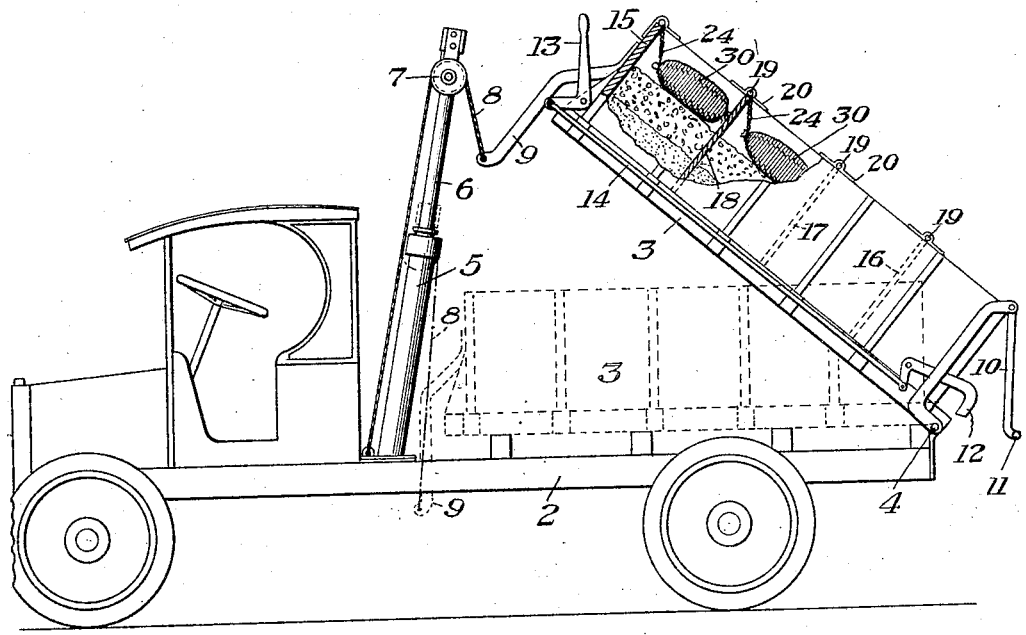
Figure 1 is a side elevation, partly in section, of a carrier embodying my invention.
Figure 2:
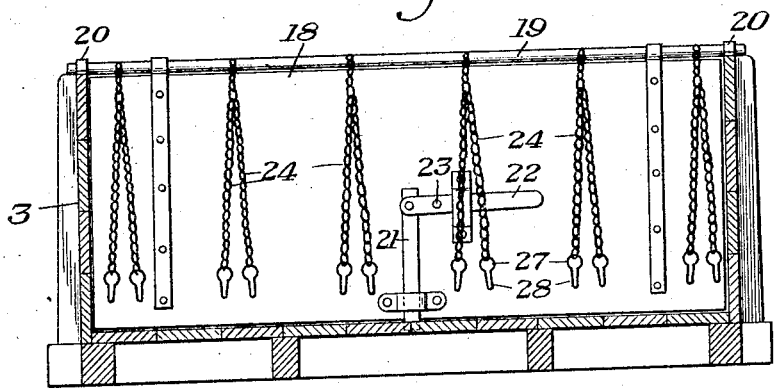
Figure 2 is a transverse sectional view through the body of the carrier showing a plurality of the bag holding chains in position therein.

Broadly, my invention involves placing the bulk material, usually sand and gravel, in a dumping carrier and then placing the cement in bags on top of the bulk material and securing these bags to a wall of the carrier. The carrier is then moved to the dumping point and the bags opened and their contents dumped simultaneously with the dumping of the bulk material. Referring to Figure 1, there is illustrated a truck 2 provided with a body 3 adapted to be tilted about a transverse axis 4 at the rear end thereof by raising the front end of said body. The raising of the front end of said body is accomplished by means of a fluid pressure cylinder 5 having a plunger 6 working therein, the said plunger carrying at its upper end a pulley 7 over which extends a cable 8, this cable being connected at one end to the truck adjacent the lower end of the cylinder 5 and having its other end connected to an arm 9 rigidly attached to the forward end of the body 3. It will be apparent that when the plunger is raised by admitting pressure fluid beneath the same, the body 3 will be moved into the inclined position shown in Figure 1. The body 3 is provided at the rear end thereof with a tail-gate 10 adapted to swing about its upper edge and having a pin 11 projecting from the lower portion thereof and adapted to be engaged by a swinging detent 12 for holding the tail-gate in closed position. The detent 12 is actuated by means of a handle 13 through a connecting link 14. Intermediate the tail-gate 10 and the forward end wall 15 of the body, transverse partitions 16, 17 and 18 are provided, these partitions dividing the body into four compartments. Each partition has a rod 19 extending along the upper edge thereof and journalled at its opposite ends in suitable brackets 20 carried by the side walls of the body, whereby each partition is adapted to swing about its upper edge. In Figure 2 means is illustrated whereby a partition is normally maintained in vertical position. This means comprises a sliding bolt 21, the lower end of which normally engages an opening in the bottom of the body. A lever 22 is pivoted to the partition at 23 and has one end thereof pivotally connected to the bolt. By striking upon the other end of the lever with a hammer or the like, the bolt may be raised to allow the partition to swing about its pivotal axis into a position similar to the position occupied by the tail-gate 10 in Figure 1. The carrier described is of a well known type used in transporting sand and gravel to a cement mixer.

In carrying out my invention, I secure to the front end wall 15 of the body and also to the partitions 16, 17 and 18 a plurality of chains 24, each adapted to have one end of a bag containing cement secured thereto. Referring particularly to Figures 3 and 4, each chain comprises a body portion 25 to one end of which is connected a pair of branch portions 26. Each branch portion terminates in a ring member 27 having an integral loop portion 28. This loop portion is adapted to receive in the bight thereof a gathered portion 29 at one end of a cement bag 30. The chains 24 may conveniently be secured to the partitions 16, 17 and 18 by riveting one end thereof to the pivot rod 19 at the upper edge of each partition. These chains may be secured to the front end wall 15 by fastening one end thereof to the upper edge of said end wall.

A truck equipped in the manner described with these chains may be moved to the source of supply of the sand and gravel and a sufficient amount of each of these materials placed in each compartment thereof for a batch. The truck may then be moved to a warehouse and have a sufficient number of bags of cement placed on top of the sand and gravel in each compartment, and these bags may be secured at one end by the chains in the manner illustrated in Figure 3. Thereafter the truck may be moved to the cement mixer and backed into position and the body thereof tilted into the position illustrated in Figure 1. The operator may then open the bags of cement contained in the rear compartment as by cutting the cord 31 securing the mouth of each bag, and may then release the tail-gate 10. As soon as he does this, the tail-gate will swing into the position shown in Figure 1 and the sand, gravel and cement contained in the rear compartment will immediately fall into the charging pan of the cement mixer. This operation may be repeated for the cement, sand and gravel contained in each of the other compartments.

The advantages of my improved method and apparatus will be readily apparent. A single workman can readily attend to the discharging of the sand, cement and gravel from each compartment and he is not required to handle the bags of cement after they are once placed in the carrier. The bags of cement do not have to hauled by a separate carrier and placed at points along the road or street, which, as already pointed out, is objectionable because of the fact that it involves a considerable amount of manual labor for handling the cement and exposes the workmen to an excessive amount of dust. Furthermore, where the bags of cement are placed in piles along the road or street, they must be protected in case of rain, whereas by my method the cement may remain in the warehouse and be taken out as needed.

I claim:

1. The method of handling and transporting material supplied in original packages and also bulk material, which comprises depositing the bulk material in a dumping carrier, placing an original container having its material therein above the bulk material and fastening the container to the carrier, moving the carrier to a dumping point, opening the container and dumping the contents of the original container together with the bulk material in the dumping carrier, substantially as described.

2. The method of handling and transporting material supplied by the manufacturer in original containers and also bulk material, which consists in placing the bulk material in a carrier having a tiltable body, placing an original container over the bulk material and fastening said container to the carrier, moving the carrier to the dumping point, opening the original container, and tilting the body to effect dumping of the contents of the original container together with the bulk material, substantially as described.

3. The method of handling and transporting a binder material supplied in original containers by the manufacturer together with an aggregate material in bulk, which comprises depositing the bulk material in a dumping carrier, placing the original containers having the binder material therein on the bulk material in the carrier, fastening said containers to the carrier, moving the carrier to the dumping point, opening the containers, and dumping the binder material and the aggregate material together, substantially as described.

4. The method of handling and transporting loose bulk material and another material supplied by the manufacturer in original containers and desired to be mixed with the bulk material, which comprises depositing the bulk material in a dumping carrier, laying the original containers in the dumping carrier on top of the bulk material, fastening the containers to the carrier, and moving the carrier to the dumping point, then opening the containers and dumping all the materials together, substantially as described.

In testimony whereof I have hereunto set my hand.

WILFRED H. DRATH.